United States Patent
Materna et al.

(10) Patent No.: US 10,707,802 B1
(45) Date of Patent: Jul. 7, 2020

(54) PRESSURIZED PUMPED HYDRO STORAGE SYSTEM

(71) Applicant: AquaEnergy, LLC, Boston, MA (US)

(72) Inventors: Peter A Materna, Metuchen, NJ (US);
Ralph L Hensler, New York, NY (US);
Leonid Lozinsky, Newton, MA (US)

(*) Notice: Subject to any disclaimer, the term of this patent is extended or adjusted under 35 U.S.C. 154(b) by 11 days.

(21) Appl. No.: 15/919,187

(22) Filed: Mar. 12, 2018

Related U.S. Application Data

(60) Provisional application No. 62/470,603, filed on Mar. 13, 2017, provisional application No. 62/470,407, filed on Mar. 13, 2017.

(51) Int. Cl.
| | |
|---|---|
| *H02S 10/20* | (2014.01) |
| *F03B 13/06* | (2006.01) |
| *H02S 20/32* | (2014.01) |
| *H02K 7/18* | (2006.01) |
| *B65D 88/16* | (2006.01) |

(52) U.S. Cl.
CPC .............. *H02S 10/20* (2014.12); *F03B 13/06* (2013.01); *H02K 7/1823* (2013.01); *H02S 20/32* (2014.12); *B65D 88/16* (2013.01)

(58) Field of Classification Search
CPC .................................. H02S 20/30; B65G 5/00
See application file for complete search history.

(56) References Cited

U.S. PATENT DOCUMENTS

| | | | |
|---|---|---|---|
| 1,986,273 A | 1/1935 | Leffingwell | |
| 3,330,118 A | 7/1967 | Biais | |
| 3,416,762 A | 12/1968 | Headrick | |
| 3,736,754 A * | 6/1973 | Azalbert | B65D 88/76 405/53 |
| 4,067,544 A | 1/1978 | Vetter et al. | |
| 4,068,480 A * | 1/1978 | Lefever | B65D 88/76 405/270 |

(Continued)

FOREIGN PATENT DOCUMENTS

| | | |
|---|---|---|
| DK | 177031 B1 | 2/2011 |
| EP | 0 002 372 | 6/1979 |

(Continued)

OTHER PUBLICATIONS

Jan Olsen; A new principle for underground pumped hydroelectric storage; Journal of Energy Storage 2 (2015), p. 54-63.

*Primary Examiner* — Thomas E Lazo
(74) *Attorney, Agent, or Firm* — Peter Materna

(57) ABSTRACT

An energy or water storage system can comprise a storage reservoir, a discharge reservoir, a pump for charging the storage reservoir, and a turbine or similar discharge device. The storage reservoir can comprise a flexible bag covered by overburden that creates pressure inside the bag. Energy is stored by raising the overburden. The bag can comprise a shaped internal filler piece to prevent formation of a crease at the bag edge. Solar panels can be mounted above any bag to make additional use of the land. Solar panels mounted on overburden can have tracking mechanisms and controls suitable to achieve desired orientation regardless of the slope of overburden. Elevation difference between the storage reservoir and discharge reservoir can be used, including an underground cavity. The bag can have internal tethers to influence bag shape.

12 Claims, 9 Drawing Sheets

(56) References Cited

U.S. PATENT DOCUMENTS

| | | | |
|---|---|---|---|
| 4,136,723 A | 1/1979 | Skaadel et al. | |
| 4,231,873 A * | 11/1980 | Swigger | B65D 88/78 |
| | | | 210/170.05 |
| 4,247,220 A | 1/1981 | Furman | |
| 4,362,199 A | 12/1982 | Futerman | |
| 4,372,533 A | 2/1983 | Knaus et al. | |
| 4,390,051 A | 6/1983 | Cuthbertson | |
| 4,542,626 A * | 9/1985 | Colin | B65D 88/76 |
| | | | 62/53.1 |
| 4,781,475 A | 11/1988 | LaFleur | |
| 4,948,107 A | 8/1990 | Orndorff | |
| 5,157,922 A | 10/1992 | Rosenberg | |
| 5,316,387 A | 5/1994 | Polett et al. | |
| 5,323,922 A | 6/1994 | LaPoint, Jr. et al. | |
| 5,328,268 A | 7/1994 | Lafleur | |
| 5,506,012 A | 4/1996 | Wright et al. | |
| 5,685,644 A | 11/1997 | Taylor | |
| 5,785,175 A | 7/1998 | Cholsaipant | |
| 5,885,679 A | 3/1999 | Yasue et al. | |
| 6,004,035 A | 12/1999 | Hafer et al. | |
| 6,015,057 A | 1/2000 | Stone et al. | |
| 6,186,701 B1 | 2/2001 | Kempers | |
| 6,203,198 B1 | 3/2001 | Stone | |
| 6,220,755 B1 | 4/2001 | Brown et al. | |
| 6,328,470 B2 | 12/2001 | Brown et al. | |
| 6,402,378 B1 | 6/2002 | Shackleton | |
| 6,513,418 B1 | 2/2003 | Simmons et al. | |
| 6,565,256 B2 | 5/2003 | Derby et al. | |
| 6,739,274 B2 | 5/2004 | Eagles et al. | |
| 6,783,300 B2 * | 8/2004 | Doolaege | E02B 3/108 |
| | | | 405/115 |
| 6,860,068 B2 | 3/2005 | Halloran | |
| 6,935,500 B1 | 8/2005 | Schnaars | |
| 6,935,782 B2 | 8/2005 | Cholsaipant | |
| 6,996,937 B2 | 2/2006 | Halloran | |
| 7,003,955 B2 | 2/2006 | Davis | |
| 7,114,879 B2 | 10/2006 | Obermeyer | |
| 7,360,266 B2 | 4/2008 | Kasatshko | |
| 7,503,885 B2 | 3/2009 | Reicin et al. | |
| 7,506,776 B2 | 3/2009 | Podd | |
| 7,770,331 B2 | 8/2010 | Halloran | |
| 8,287,209 B2 | 10/2012 | Feldman et al. | |
| 8,485,757 B2 | 7/2013 | Nomoto | |
| 8,496,810 B2 | 7/2013 | Forrest | |
| 8,678,652 B1 | 3/2014 | Nattrass | |
| 8,698,338 B2 | 4/2014 | Slocum et al. | |
| 8,777,523 B2 | 7/2014 | Stephens et al. | |
| 8,950,181 B2 * | 2/2015 | Ivy | F03G 3/00 |
| | | | 60/415 |
| 8,966,689 B2 | 3/2015 | McGuire et al. | |
| 9,394,885 B2 | 7/2016 | Wood | |
| 9,410,559 B2 | 8/2016 | VanWalleghem | |
| 9,416,796 B2 | 8/2016 | VanWalleghem | |
| 9,475,556 B1 | 10/2016 | Pirtle | |
| 9,611,867 B2 * | 4/2017 | Ivy | F03G 3/00 |
| 9,719,225 B2 | 8/2017 | Abeles | |
| 9,784,413 B2 | 10/2017 | Lewis et al. | |
| 9,982,406 B2 | 5/2018 | Bradley, Sr. et al. | |
| 1,002,984 A1 | 7/2018 | Yaremenko et al. | |
| 1,023,389 A1 | 3/2019 | Stenzel | |
| 2005/0034452 A1 * | 2/2005 | Davis | E02B 9/00 |
| | | | 60/398 |
| 2006/0165320 A1 | 7/2006 | Stephens | |
| 2008/0001130 A1 | 1/2008 | Dibdin | |
| 2011/0044564 A1 | 2/2011 | Lin | |
| 2011/0070031 A1 | 3/2011 | Frazier et al. | |
| 2011/0113769 A1 * | 5/2011 | Olsen | F03B 13/06 |
| | | | 60/416 |
| 2014/0042753 A1 | 2/2014 | Bahner et al. | |
| 2014/0263345 A1 | 9/2014 | Morgan | |
| 2016/0025115 A1 | 1/2016 | Ali | |
| 2017/0167096 A1 * | 6/2017 | Obermeyer | A61F 2/441 |

FOREIGN PATENT DOCUMENTS

| | | |
|---|---|---|
| EP | 0034023 A1 | 8/1981 |
| WO | WO2010003412 A2 | 1/2010 |
| WO | WO2015042616 A1 | 3/2015 |
| WO | WO2016040731 A1 | 3/2016 |
| WO | WO2016116625 A1 | 7/2016 |
| WO | WO2019068293 A1 | 4/2019 |

\* cited by examiner

Figure 1C
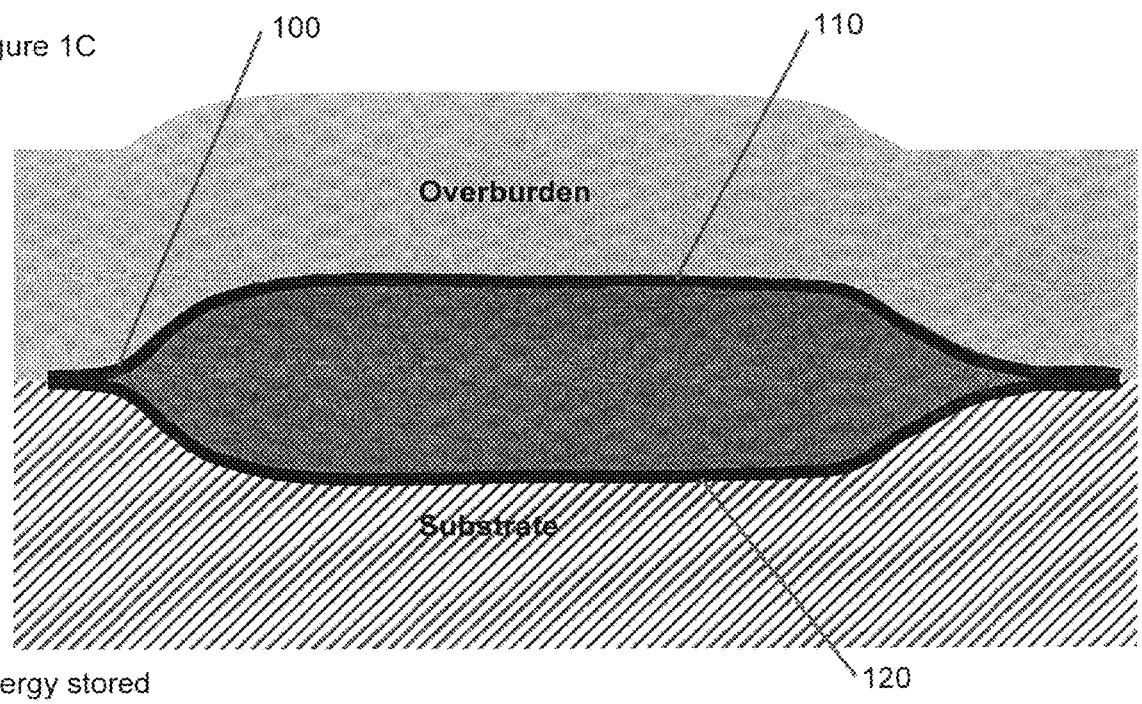
Energy stored
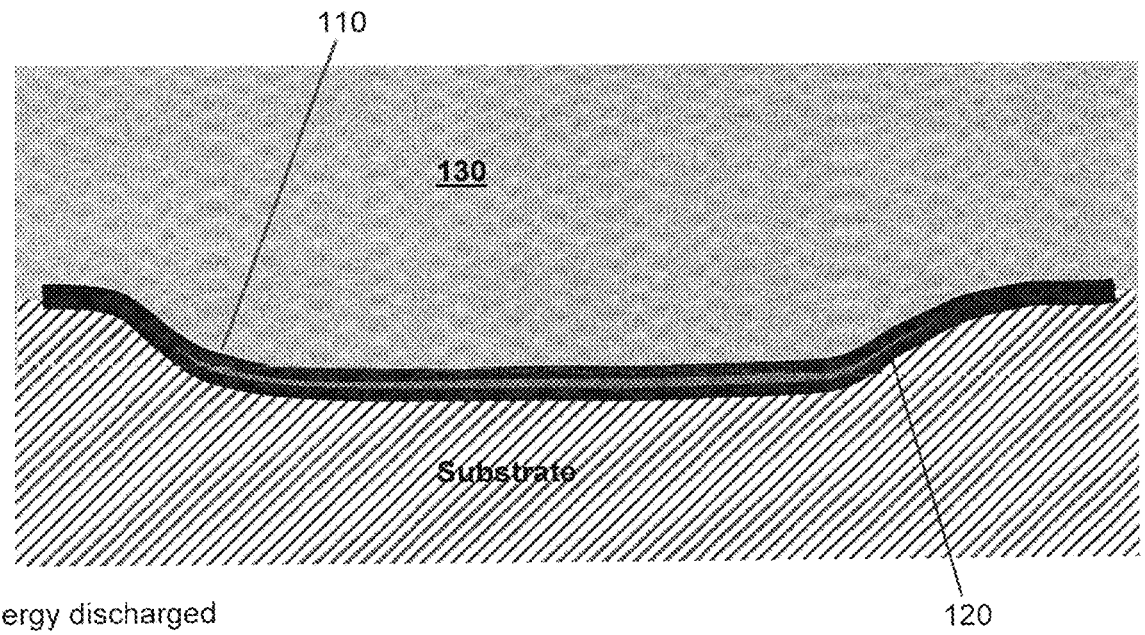
Energy discharged
Figure 1D

Figure 2A
a lap joint
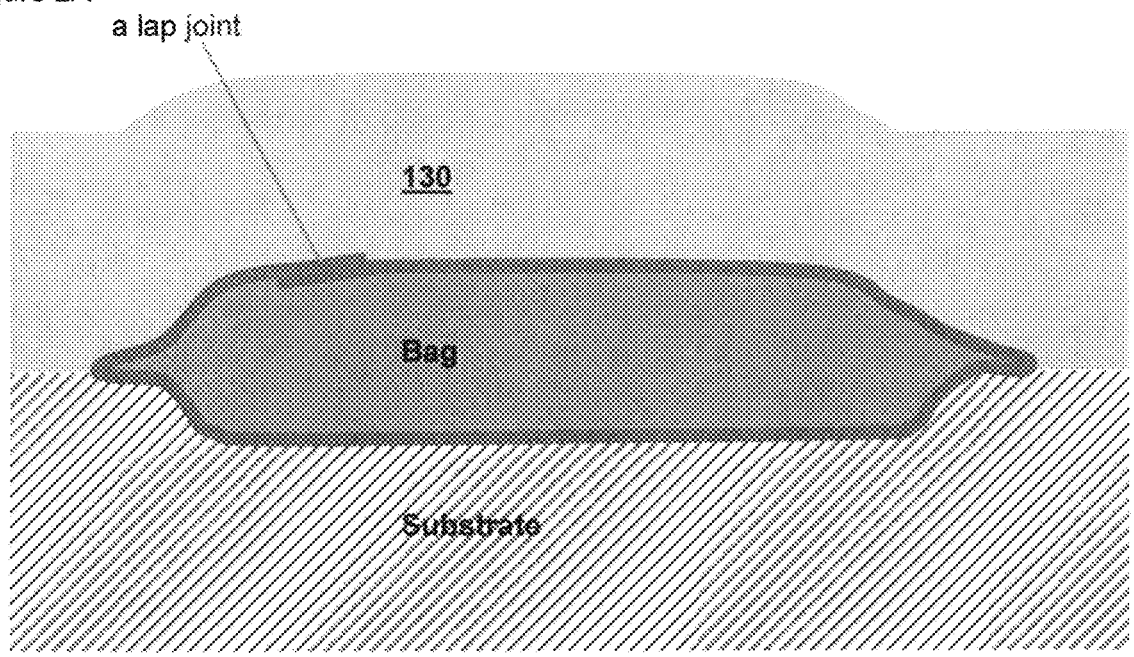
Energy stored
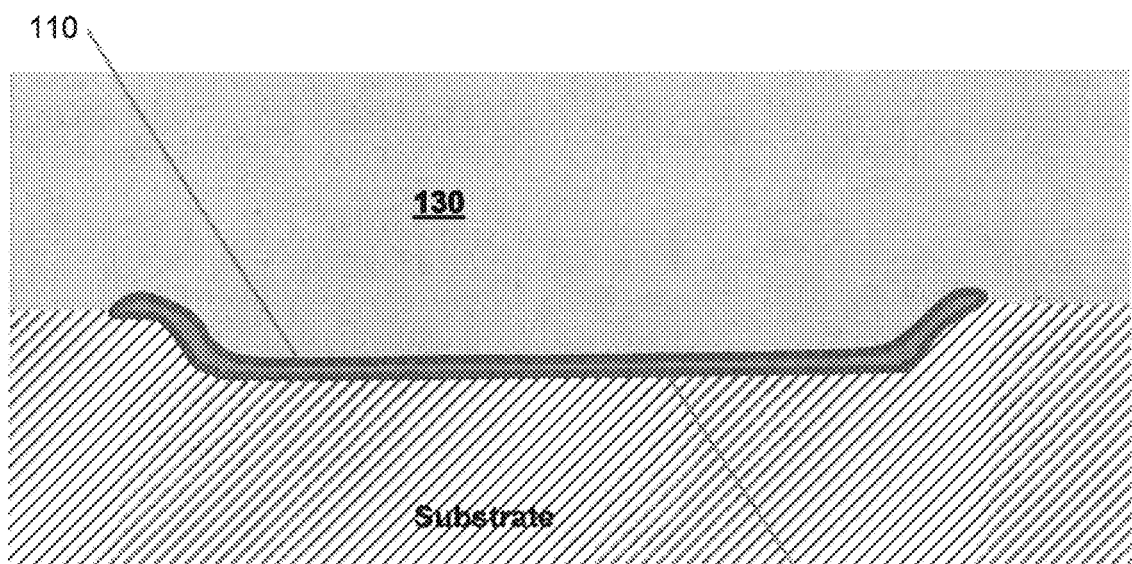
Energy discharged
Figure 2B

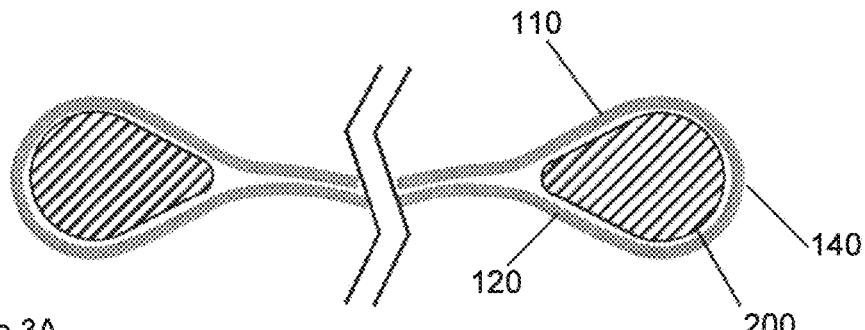
Figure 3A
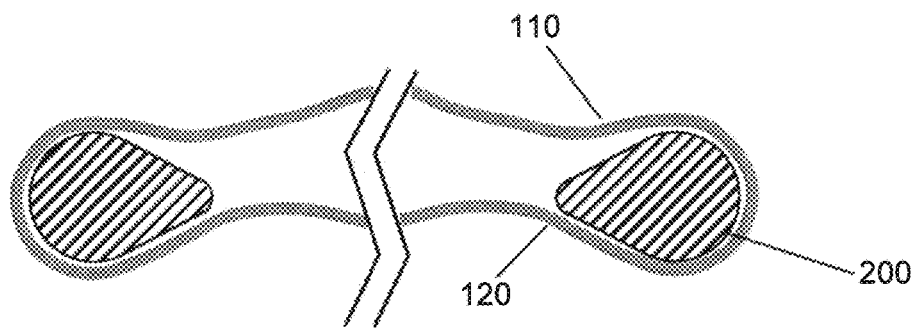
Figure 3B
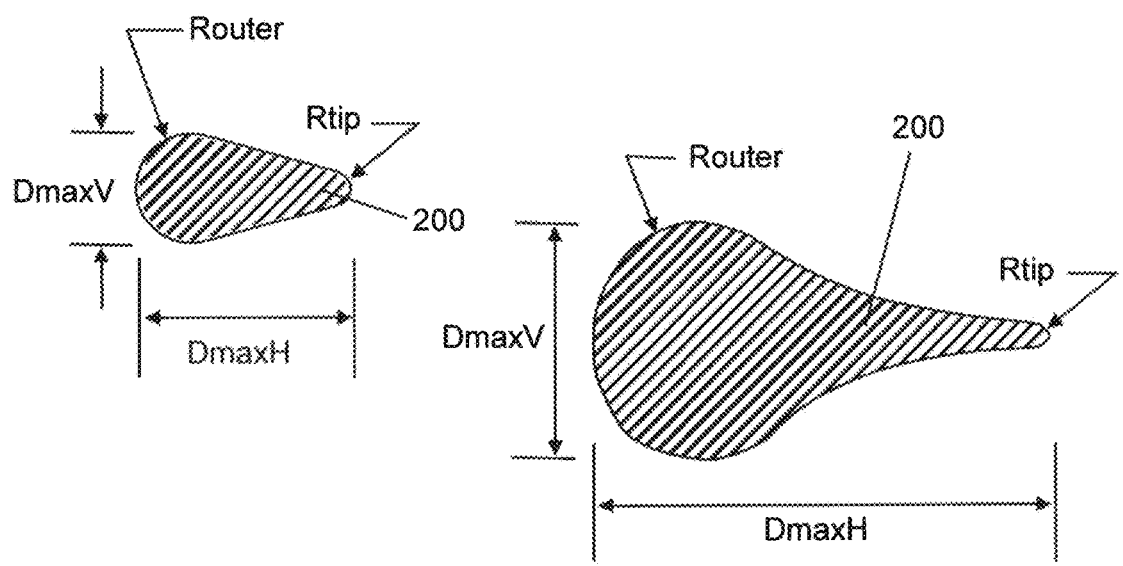
Figure 3C
Figure 3D

650
H lift
130

650
130

PRESSURIZED PUMPED HYDRO STORAGE SYSTEM

CROSS-REFERENCE TO RELATED APPLICATIONS

This patent application claims the benefit of Provisional Patent Application U.S. Ser. No. 62/470,603, filed Mar. 13, 2017, and Provisional Patent Application U.S. Ser. No. 62/470,607, filed Mar. 13, 2017, all of which are incorporated herein by reference in their entirety.

BACKGROUND OF THE INVENTION

There is a general need for energy storage technologies, such as to help balance supply and demand in the electric power grid. This need becomes more prominent with the increasing use of renewable energy sources such as wind and solar, because the pattern of energy generation from those sources tends to be irregular in time and not necessarily well matched to demand.

Currently, the energy storage technology that has by far the largest base of experience at significant size scales is pumped storage hydro. Conventional pumped storage hydro uses two reservoirs of water at different elevations. However, new sites for pumped storage hydro are often non-optimal for reasons of topographical location, environmental sensitivity or significant capital expenditure. It would be desirable to allow the use of pumped storage technology in more locations including at sites that are not mountainous.

A known effort of this type is published by Olsen as US patent application 20110113769, and WO2010003412A2, and also "A new principle for underground pumped hydroelectric storage," by Jan Olsen, Journal of Energy Storage 2 (2015) 54-63). In this system, hydraulic head is created by the weight of soil on top of a deformable bag. The soil has a density greater than the density of water. When the bag is filled with a fluid such as water so as to store energy, the soil on top of the bag is lifted upward. For recovery of energy, the fluid such as water is allowed to flow out of the bag as the soil on top of the bag settles to a lower elevation. Energy storage is accomplished using a pump, and energy recovery is accomplished with a turbine-generator. Similar technology is described in U.S. Pat. No. 8,950,181 to Ivy et al. In general, it is desirable to provide further improvements in energy storage by pressurized water stored in bags, including improvements relating to bag design and placement.

SUMMARY OF THE INVENTION

An embodiment of the invention can include an energy or water storage system comprising: a bag comprising a deformable boundary defining an interior that can be filled with a fluid and emptied of the fluid as desired, the bag being capable of occupying a less-filled configuration and a more-filled configuration; a mass of overburden overlying the bag, the mass being able to be raised and lowered as a function of an extent of filling of the interior of the bag, wherein the interior of the bag comprises an internal filler piece having a longitudinal direction that at least approximately follows all or at least a portion of an outer edge perimeter of the bag, wherein the internal filler piece has a cross-sectional shape, the cross-sectional shape being a shape of a cross-section taken perpendicular to the longitudinal direction, wherein the cross-sectional shape, at an outer-facing portion of the internal filler piece, has a curved shape in contact with an interior surface of the bag, and the curved shape in contact with the bag interior surface has an outer radius of curvature that is at least one bag material thickness of the bag. Such a bag can also include an internal tether to influence the shape of the bag.

An embodiment of the invention can include an energy or water storage system comprising: a bag comprising a deformable boundary defining an interior that can be filled with a fluid and emptied of the fluid as desired, the bag being capable of occupying a less-filled configuration and a more-filled configuration; a mass of overburden overlying the bag, the mass being able to be raised and lowered as a function of a degree of filling of the interior of the bag, further comprising a plurality of solar energy collectors placed atop the overburden and transmitting at least some of their weight to the overburden, wherein the system uses at least some energy produced by the solar collectors and stores the energy by increasing a filling of the bag. The solar energy collectors can comprise a tracking system and the tracking system can achieve a desired orientation of the some of the solar energy collectors regardless of a local orientation of a surface of the overburden at a location of the some of the solar collectors. There can be tilt or orientation sensors to which the controls are responsive.

An embodiment of the invention can include a method of creating an energy or water storage system, the method comprising: placing a storage bag on ground or a prepared substrate; excavating in ground near the storage bag, producing excavated dirt, wherein at least some of the excavated dirt is place atop the storage bag; creating a first discharge reservoir in a region that has been excavated; and providing and connecting a first pump device suitable to pump a liquid from the first discharge reservoir into the storage bag, and a first energy recovery device suitable to recover energy from passage of the liquid into the first discharge reservoir. Such a method can involve creating a second discharge reservoir at an elevation different from the elevation of the first discharge reservoir. Such reservoirs can be depressions in the earth's surface or an underground cavity.

BRIEF DESCRIPTION OF THE ILLUSTRATIONS

Embodiments of the invention are further described in the following non-limiting illustrations.

FIG. 1C shows a bag configuration in which energy is stored.

FIG. 1D shows the same bag in a configuration in which energy is discharged.

FIG. 2A shows a bag, having a lap joint located away from the edge of the bag, in a configuration in which energy is stored.

FIG. 2B shows the same bag in a configuration in which energy is discharged.

FIG. 3A shows, in cross-section, a bag having an internal filler piece, when the bag is nearly empty.

FIG. 3B shows, in cross-section, a bag having an internal filler piece, when the bag is nearly full.

FIG. 3C shows certain dimensions of an internal filler piece having a tapered shape.

FIG. 3D shows certain dimensions of an internal filler piece having a teardrop shape.

DETAILED DESCRIPTION OF THE INVENTION

Figure 1A:
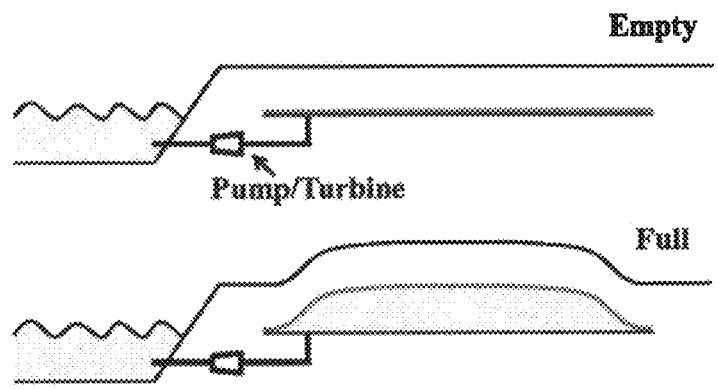
FIG. 1A is a view of an energy storage system.

Referring now to FIG. 1A, there is shown an energy storage system comprising a storage reservoir and a discharge reservoir. The storage reservoir comprises a bag that is filled with fluid (water) and is covered with a layer of overburden that creates pressure inside the bag. Filling of the bag causes lifting of the overburden and storage of energy. Retrieval of energy is accomplished by letting fluid out of the bag through a turbine or similar energy recovery device. As illustrated, the discharge reservoir is an open body of water.

Figure 1B:
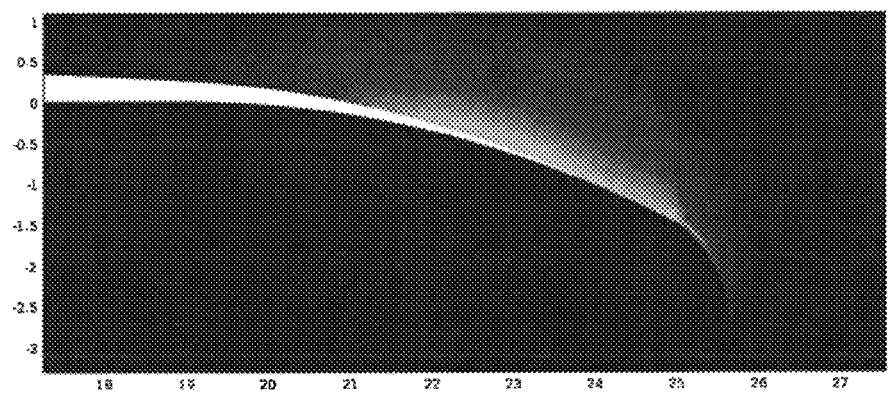
FIG. 1B is a view of a detail of the bag used in experiments by Olsen.

FIG. 1B, from the Olsen reference shows details of the shape of the bag at its edges, as described by Olsen, for the situation where the bag is full, with the axes being dimensions in meters. In the Olsen journal article, the bag placement with respect to earth material is such that its edge has a downturned shape i.e., the outermost part of the bag very close to the edge is nearly vertical, and the joint itself is located in earth that is some distance away from the region of earth that is actively involved in moving during filling and emptying of the bag. The report of Olsen's experiments, corresponding to FIG. 1B, indicates that when the bag was full, it was filled to a vertical dimension that is only several percent of the lateral dimension of the bag. The vertical lift distance is a parameter in the economics of such a system, such that for a given bag construction, a greater lift distance is believed to improve the economics of the system. In the Ivy reference, the appearance of the edge of Ivy's bag is somewhat different from what is in the Olsen reference, although the Ivy reference does not provide great detail about the geometry of the edge of the bag or about joints in the bag. It is further believed that another parameter in improving the economics of the system is to increase the thickness (or weight) of the layer of overburden.

Referring now to FIG. 1C-1D, there is illustrated one possible design of the edge of the bag in embodiments of the invention. This is similar to the system of Olsen, except that the shape of the substrate is dished so as to allow greater vertical lift distance. In such a design, the bag is illustrated as being formed of two sheets of material that are joined face-to-face at their edges, forming an upper layer 110 and a lower layer 120. When the bag 100 is empty the bag can lay flat without causing any further crease or folding of material at the edges of the bag because of the face-to-face nature of the joint that already exists at the bag edge and defines the bag edge. However, with such a joint design, just as in Olsen, the internal pressure inside the bag 100 can act in a way such as to try to separate the joint, i.e., to peel the two sheets away from each other.

Bag Edges Having Continuous Bag Material and Shaped Internal Filler Piece

Referring now to FIGS. 2A-B, for embodiments of the invention, there is illustrated another possible design of the edge of the bag. In such a design, the bag material is continuous around the edge from upper surface 110 to lower surface 120 of the bag 100. In FIG. 2A-B there is also shown a joint, in the form of a lap joint, where two pieces of material overlap with each other for some distance. As illustrated, the lap joint is located somewhere other than where a crease on the outside of the bag 100 may be located. In general, such a lap joint could be located anywhere that may be desired. A system in which the bag material is continuous around the edge (as in FIG. 2A and FIG. 2B) appears to be capable of somewhat larger vertical dimension increase or lift distance (possibly expressed in proportion to a lateral dimension of the bag), compared to the amount of lift that is reported by Olsen in the situation of FIG. 1B.

In geometries in which the bag material is continuous from the upper surface to the lower surface of the bag as in FIG. 2B, it is possible that when the bag is empty and overburden is pressing down on the bag, a crease could be formed at the edge of the bag, and the crease could have a fairly small radius of curvature, due to load exerted on the bag from above by the overburden 130. Furthermore, when the same bag is full, the crease can be expected to open up or unfold to a more gentle radius of curvature. Such change of local curvature at the edge of the bag could be repeated during every charge-discharge cycle. This change of local curvature has the possibility of damaging or weakening the bag material in the immediate vicinity of the crease, especially when such motion is repeated many times. This repeated motion could make the crease location a potential source of failure of the bag.

Referring now to FIG. 1A and FIG. 3, in an embodiment of the invention, there may be provided an energy storage system 10 comprising a bag 100. The bag 100 may comprise an upper layer 110 and a lower layer 120 opposed to the lower layer 110. The bag 100 may be able to contain an internal pressure. The bag 100 may be at least partially covered with a distributed weight such as a deformable or flowable material, which is overburden 130, which may be in contact with upper surface of upper layer 110, and may create an internal pressure inside the bag 100.

Bag 100 may have an outer edge 140. Inside bag 100, there may be an internal filler piece 200, which may serve to prevent the bag from forming a sharp crease at the bag outer edge in the bag is nearly empty and is being pressed upon by overburden. The internal filler piece 200 may be located near edge 140 of the bag 100 and may extend along edge 140 of bag 100. The internal filler piece 200 may proceed all around the circumference of bag 100. Accordingly, the internal filler piece 200 may form a closed loop. For example, it is possible that the overall shape of the bag 100 may, in plan view, be generally rectangular having rounded corners. In such a situation, the overall shape of the closed loop of internal filler piece 200 may also be a rounded rectangular suitable to fit inside the bag 100 close to the outer edge of the bag 100. However, it is not essential that the internal filler piece 200 be a closed loop. The internal filler piece 200 could be in segments, or could be of other form. The internal filler piece 200 could be attached to the interior of bag 100, perhaps intermittently, or it does not have to be so attached.

Referring now to FIG. 3A, there is shown (on two opposed sides of the bag, with a central region of the bag broken away for clarity of illustration), internal filler piece 200 and the bag 100 itself for a nearly-empty condition. FIG. 3B shows the same components with the bag 100 being in a partially-full condition. It can be seen that in FIG. 3B, in regard to the top or upper layer of the bag, less of the bag is in close contact with the internal filler piece 200, although the contact of the bottom or lower layer of the bag with the internal filler piece 200 remains approximately the same as in FIG. 3A. Referring now to FIG. 3C, there are illustrated certain dimensions of the cross-sectional shape of the internal filler piece 200. the maximum overall horizontal dimension DmaxH, the maximum overall vertical dimension DmaxV, the radius of curvature of the outward-facing curved surface Router, and the radius of curvature of the inward-facing tip Rtip. Referring now to FIG. 3D, there is shown an alternate possible shape of the internal filler piece 200, which may be described as a teardrop shape. Its dimensions can be characterized similarly to those of FIG. 3C, but in FIG. 3D the cross-sectional shape also has a gentle concavity between the tip and the outward-facing curved surface.

The internal filler piece 200 may have a longitudinal direction, or at least a local longitudinal direction along a portion of its length, and may have a cross-sectional shape, in a cross-section taken perpendicular to the longitudinal direction of internal filler piece 200. The cross-sectional shape of internal filler piece 200 may be such that on an outer-facing portion of the internal filler piece 200, the curved shape that may contact the interior surface of bag 100 may have a radius of curvature that is at least one bag material thickness of bag 100. The internal filler piece 200 may have a maximum external dimension in the vertical direction that is at least one thickness, or at least two thicknesses (two times the bag material thickness), or at least five thicknesses, of the bag material.

The cross-sectional shape of internal filler piece 200 may have a horizontal dimension that is greater than its vertical dimension.

The cross-sectional shape of internal filler piece 200 may have a smallest radius of curvature facing away from the bag that is smaller than the radius of curvature of internal filler piece 200 facing the adjacent bag 100.

The internal filler piece 200 may have a shape that, on its externally-facing portion, is an arc of a circle. Internally-facing, the internal filler piece may have a taper to it. The taper may be a linear taper or other form of taper.

As illustrated in FIG. 3A-3C, the cross-sectional shape of the internal filler piece 200 may be entirely convex. The cross-sectional shape may be circular or may be elliptical or of other entirely convex shape. As yet another possible shape, the internal filler piece 200 may be convex in some places and concave in other places. An example of such would be a teardrop shape as illustrated in FIG. 3D.

At its innermost edge, the internal filler piece 200 may be somewhat sharp, and yet even a relatively sharp edge can be described by a radius of curvature. The sharper the edge, the smaller is its radius of curvature. The internally facing edge of the internal filler piece 200 may have a radius of curvature that is less than the thickness of the bag material, or less than 0.5* the thickness of the bag material (i.e., half of the thickness of the bag material), or less than 0.2* the thickness of the bag material, or less than 0.1* the thickness of the bag material.

Co-Location with Solar Panels

In an embodiment of the invention, a pressurized pumped storage hydro system may be co-located with a solar energy collection system. Solar energy panels systems such as photovoltaic panels are practical for use on vacant land of moderate or larger size, just as is embodiments of the invention.

In regard to the storage reservoir, it is possible that solar panels 500 may be mounted so as to occupy at least some of the same land area as the storage reservoir, being located above the storage reservoir. One option is that the solar panels 500 can be mounted on a fixed structure that is structurally independent of the storage reservoir. Such solar panels could be fixed, single-axis tracking, or dual-axis tracking, or any other desired configuration.

In regard to the storage reservoir, the storage reservoir could be a bag or a plurality of bags, and the structural support for the solar panels 500 above the storage reservoir could be mounted in ground at the edges of the bag that is the storage reservoir. If the storage reservoir comprises multiple bags, structural supports could be mounted between various bags that make up parts of the storage reservoir.

In regard to the discharge reservoir, it is possible that solar panels 500 may be mounted so as to occupy at least some of the same land area as the discharge reservoir, being located above the discharge reservoir. The solar panels 500 can be mounted on a fixed structure that is structurally independent of the discharge reservoir. Such solar panels could be fixed, single-axis tracking, or dual-axis tracking, or any other desired configuration.

In regard to the discharge reservoir, the discharge reservoir could be a bag or a plurality of bags, and the structural support for the solar panels 500 above the discharge reservoir could be mounted in ground at the edges of the bag that is the discharge reservoir. If the discharge reservoir comprises multiple bags, structural supports could be mounted between various bags that make up parts of the discharge reservoir.

In regard to the discharge reservoir, it is possible that the discharge reservoir could be an open body of water such as a lake. In such a situation, solar panels could be part of a construct that floats on the surface of the body of water. Alternatively, the solar panels could be mounted on a structure that rests on or is anchored to the bottom of the body of water. In any such situation, such solar panels could be fixed, single-axis tracking, or dual-axis tracking, or any other desired configuration.

Figure 4A:
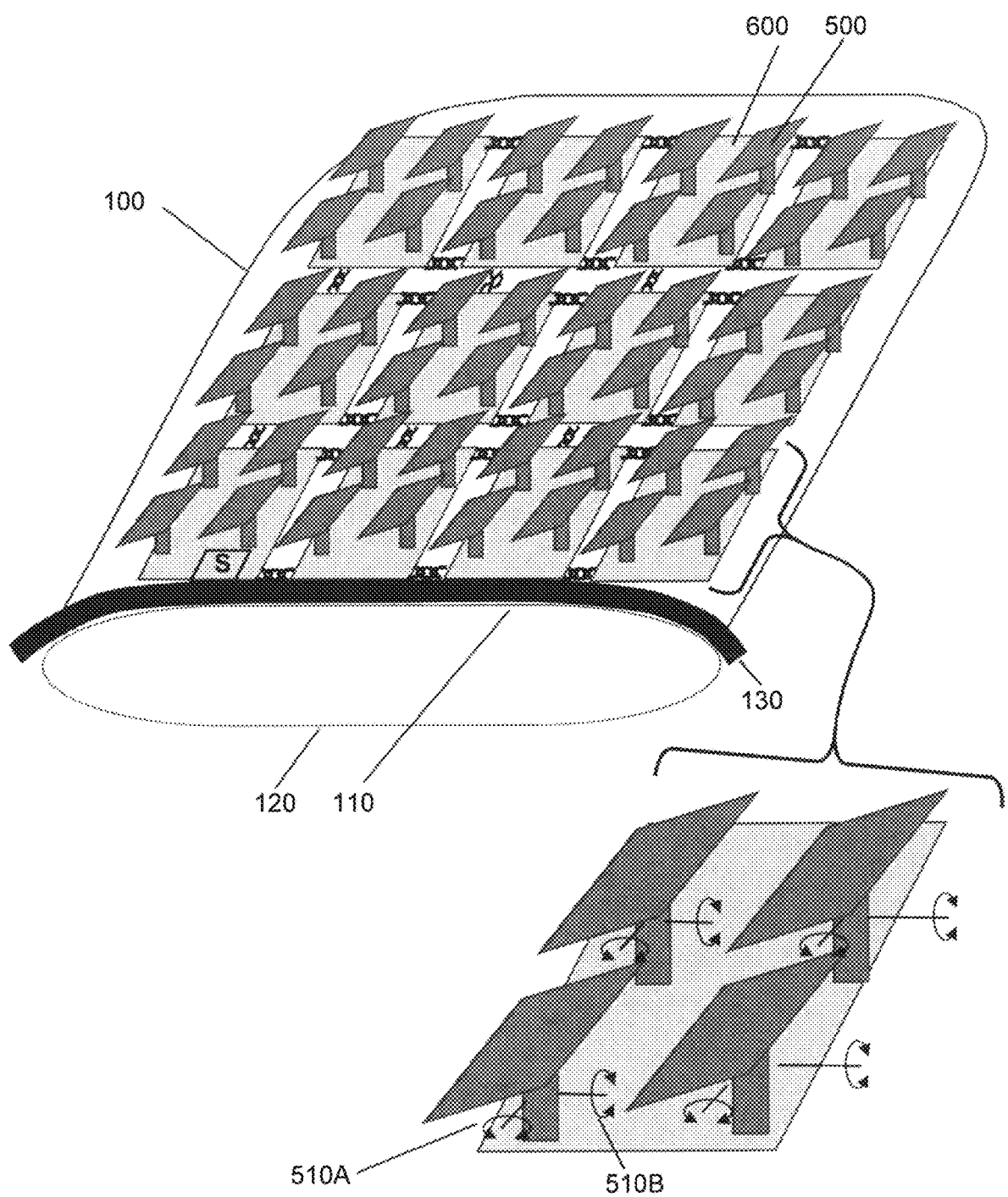
FIG. 4A shows a group of solar collectors in which a tracking system compensates for changes in the orientation of the surface of the overburden.
Figure 4B:
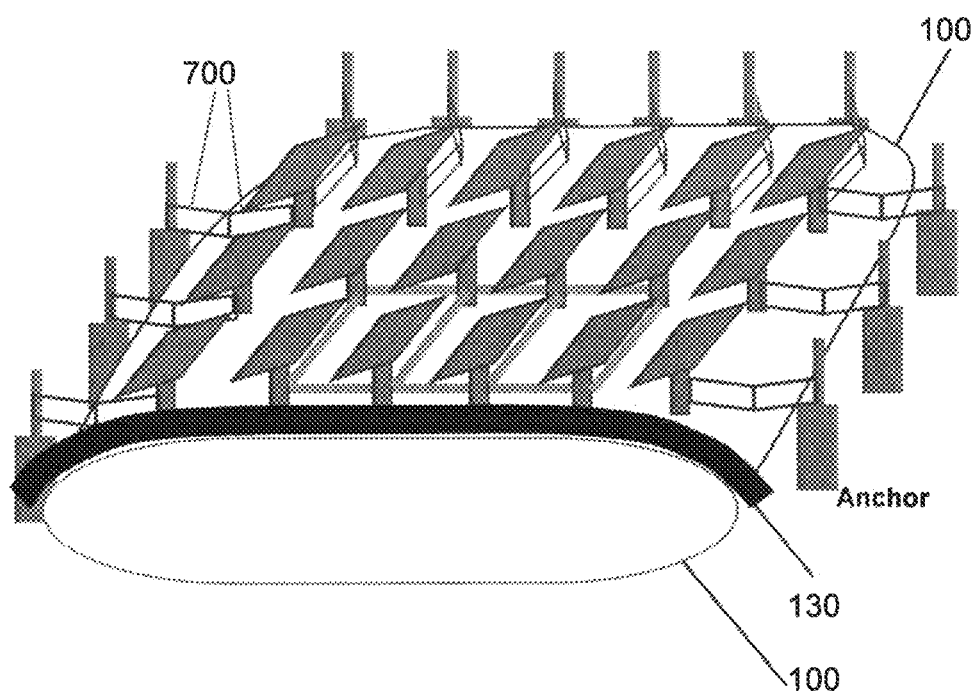
FIG. 4B shows a group of solar collectors with an orientation preservation system comprising linkages.

In regard to the storage reservoir, referring now to FIGS. 4A-4B, in an embodiment of the invention, there may be placed, atop the overburden, solar energy collectors or panels 500 that transmit at least part of their weight to the overburden 130. The weight of the solar energy collectors 500 contributes to the weight that is lifted to store energy. Electrical connections to the solar energy collectors or panels 500 could be made by cables that are sufficiently flexible and are appropriately routed to accommodate the motion of the overburden 130 during a charging-discharging cycle.

In an embodiment that combines pressurized pumped energy storage with solar panels 500, the system may be constructed by installing the bag for the storage reservoir, covering it with earth as overburden 130, and then placing solar panels 500 on top of the repositioned earth or overburden. As described elsewhere herein, the overburden 130 moves up and down as the bag 100 of the storage reservoir is filled and emptied. In addition to the vertical motion, it can be expected that portions of the overburden 130 may change their surface slope, especially near the edges of the bag 100.

If the solar panels 500 are connected to individual bases and the slope or orientation of the individual bases change, this can in turn change the orientation of solar panels 500 that are placed on top of the overburden 130. Such change of orientation can degrade the collection efficiency of the panels 500, as well as causing possible structural support problems.

It is possible that the system for supporting the solar panels 500 may comprise a tracking system such as a two-axis tracking system. It is possible that such controls could serve to achieve desired orientation of the solar panels 500 relative to gravity and to a universal coordinate system without the need to measure local orientation of the surface of the overburden 130. It is possible that such controls could move the solar panel in whatever manner relative to its support structure is needed, regardless of the orientation of a particular support. Such a control system could use information such as Global Positioning System coordinates, time-of-day information, and other information.

It is also possible that the system may comprise a tilt sensor or sensors on an individual solar panel 500 or structure or on a platform 600 to which the solar panel 500 is connected. The controls that change the orientation of an individual photovoltaic panel may be responsive to the tilt sensor(s) and to other instructions so as to maintain the individual photovoltaic panel in a desired orientation with respect to a universal coordinate system or to the sun. The use of such sensors and controls is especially suitable if the tracking system is a two-axis tracking system. Such adjustment could be achieved for individual photovoltaic panels by appropriate software programming. If the support structure for a particular solar panel 500 changes its orientation, the control system could compensate for that motion to maintain the desired orientation of solar panel 500. For solar panels that are located in the interior of the overburden region, where the surface of the overburden 130 may remain close to horizontal during all parts of the charge-discharge cycle, the controls might have only little difference or no difference from the controls for a more conventionally mounted solar panel whose support is rigidly mounted to ground. For solar panels 500 that are located near the edge of the overburden region, more sophisticated controls or algorithms might be used to compensate for the changing slope of the surface of the overburden.

As illustrated in FIG. 4, groups of several solar collectors 500 (as illustrated, four solar collectors 500) are mounted on an individual platform 600, which in turn rests on a portion of the overburden. Individual platforms 600 may be connected to other individual platforms 600 by connections that generally resist at least some relative displacement between the platforms 600 but do permit change of relative angle of the platforms. The connections are illustrated as links of chain, but of course other forms of connection are also possible. Individual platforms 600 may have individual orientations as a function of the extent of filling of the bag 100. As illustrated, there is control of the orientations of individual panels 500 by a tracking system that provides rotation of the panels 500 around two axes of rotation 510A, 510B. Such orientation control may be responsive to tilt sensors or orientation sensors. Such sensors may be located in the respective platform or in the respective solar panels, or elsewhere. Accordingly, the tracking system may orient the solar panels 500 in desired orientations despite variations in slope of the surface of overburden or the orientation of platforms 600. The slope of the surface of the overburden 130 may vary from place to place in the overburden 130 and as a function of time (or the extent of filling of the bag 100).

Alternatively, in embodiments of the invention, there may be provided a solar panel support system that comprises an orientation preservation system. For example, it may be desirable to maintain the orientation of a central post that supports an individual solar panel 500 such that the central post remains vertical. Such an orientation preservation system can comprise linkages (bars that are hinged or pinned to other bars) that form parallelograms 700. Joints in the linkages may be by pinned joints or hinges, which allow the joint to rotate around one axis of rotation, but constrain against all other types of motion. The sides of the parallelogram 700 may be bars or in general any rigid structures.

Parallelograms formed of such linkages can allow their sides to move in certain motions, while the parallelism of opposite sides is maintained. Thus, if one side of the parallelogram 700 is maintained vertical by an anchor that is mounted in fixed ground, then the opposite side of the parallelogram 700 always is vertical also. If a parallelogram 700 is just a single parallelogram linkage, although parallelism of opposed sides is maintained, there is a constraint on horizontal distance between the sides that are maintained parallel. If there is vertical motion of one of the parallel sides relative to its corresponding parallel side, then there is required to be a defined amount of horizontal motion. This might be undesirable for the present application. Accordingly, it is possible to provide an orientation preservation system that comprises two parallelograms 700 in series, connected so that they have one leg in common, which may be a vertically oriented leg. For such pair of two parallelograms 700 in series, if one edge of one parallelogram 700 is maintained vertical, then the last edge of the last parallelogram 700 still always remains vertical also, while at the same time having two parallelograms 700 in series allows for change, in the horizontal direction, of distance between two posts. A two-parallelogram linkage allows an amount of horizontal translation that is independent of motion in the vertical direction, while at the same time allowing vertical translation of the distal vertical member of the linkage. It is also possible to provide a linkage in which one end of a linkage is able to slide along a vertical post and thereby maintain verticality of the opposite end of the linkage. Such a linkage can have bars that form an "X" with a central pivot point, and are connected to each other with hinged joints at the ends of the bars.

There may be linkages, such as parallelogram linkages, in more than one direction to a particular post of a solar panel support. Linkages may connect a particular post to anchor posts that are on stationary ground, or may connect a particular post of a solar panel to a post of another solar panel, or there may be a combination of such connections.

It is also possible that, because change in the orientation of the overburden surface is expected to occur more significantly near the edge of the installation and less in the interior of the installation, it might not be necessary to provide the orientation preservation system for every solar panel 500. In such a situation, it is possible that solar panels 500 in the interior of the overburden region could be mounted to the overburden in a manner with no adjustment for possible tilting of the base, while solar panels 500 that are mounted near the edge of the overburden region could be provided with compensation for tilting of their bases. It is possible that such solar panels 500 in the interior region could be rigidly connected to each other.

If a solar panel 500 comprises an orientation preservation system such as the described linkages, it is possible that the solar panel 500 may be connected to its base by a joint that allows one or more degrees of rotation, such as a ball-and-socket joint.

Still further, if there are provided double-parallelogram linkages in two different directions, such as two mutually perpendicular directions, it is possible to provide a pivotable joint, such as at the anchor post, to allow rotation of the linkage around a vertical axis such as the anchor post or a support post that supports a solar panel.

Use of Elevation Difference

Figure 5A:
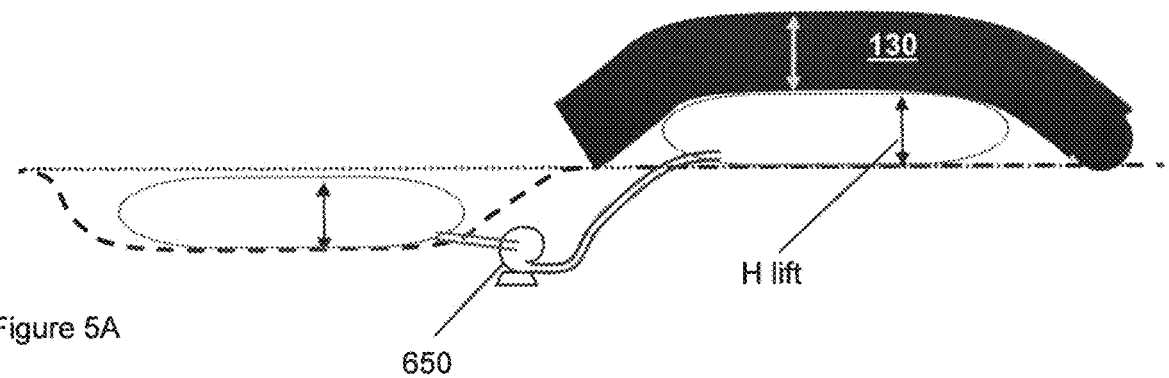
FIG. 5A shows relative elevations of a storage bag and a discharge bag and an excavation.

In embodiments of the invention, the discharge reservoir could be at a lower elevation than the storage reservoir. In such a situation, hydraulic head may come from a combination of pressure due to overburden 130 on the bag 100, and hydraulic head due to elevation difference. For example, if the system is constructed by excavating and moving earth, and if the surface area of land from which earth is excavated is roughly the same as the surface area of land that is covered by earth to form the overburden on top of the storage bag, then the depth of the excavation can be expected to be approximately the same as the height of the overburden 130. This is illustrated in FIG. 5A. Other elevational relationships are also possible. The discharge reservoir can be another bag, as illustrated in FIG. 5A, or alternatively it can be an open lake.

In FIG. 5A, the lightly dotted line indicates the original surface of the ground, assumed flat, before earthmoving. It is assumed that the storage bag rests on that ground with a berm built up at the outer edges of the storage bag to create a dish shape. It can be seen that at the start of discharge when the upper bag is full, the pressure difference or head available for energy generation is represented by the weight per unit area of the overburden, plus the pressure head of the water inside the bag, plus the pressure head due to the distance below grade to whatever is the water level in the discharge reservoir. Some of these quantities may change as a function of time during the discharge transient.

Figure 5B:
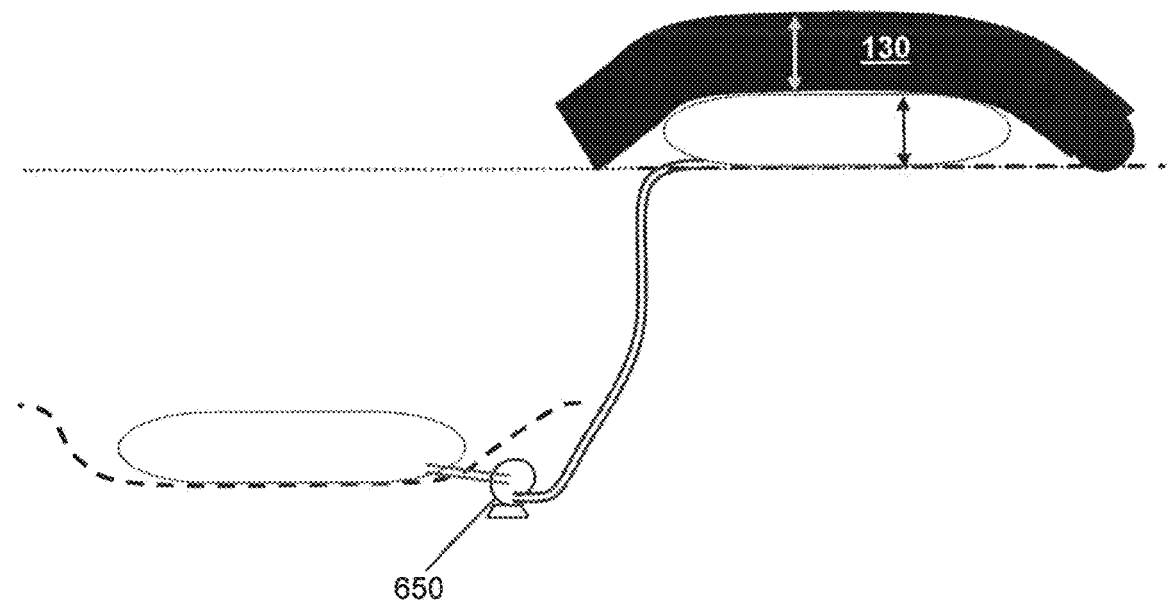
FIG. 5B shows relative elevations of a storage bag and a discharge bag in a situation in which some natural elevation difference is present.

Referring now to FIG. 5B, in still other embodiments of the invention, the discharge reservoir could be at an even lower elevation than what may be created by excavation of the soil needed to create the overburden. For example, it is possible, depending on local topography, that some naturally occurring elevation difference might be available, and the discharge reservoir could be located at a somewhat lower elevation than the storage reservoir. Such elevation difference need not be as large as the hundreds of meters of elevation difference that are typical of many conventional pumped storage hydro installations. Nevertheless, if some naturally occurring elevation difference is available, it would improve the economics of the installation by storing more energy with little or no increase in the construction costs.

It is still further possible that the discharge reservoir could be underground such as in an underground cavern. The discharge reservoir could be one volume of liquid or could be multiple volumes of liquid.

The discharge reservoir located underground could be an open-surface body of water located underground, essentially an underground lake, if desired. The discharge reservoir also could be a bag, if desired, although it might not be necessary to use a bag in such a situation.

In this situation of a discharge reservoir that is underground, placing the overburden 130 on top of the storage reservoir bag would contribute to hydraulic head, but there would also be a significant amount of hydraulic head already be available due to the distance by which the discharge reservoir is placed underground.

Figure 5C:
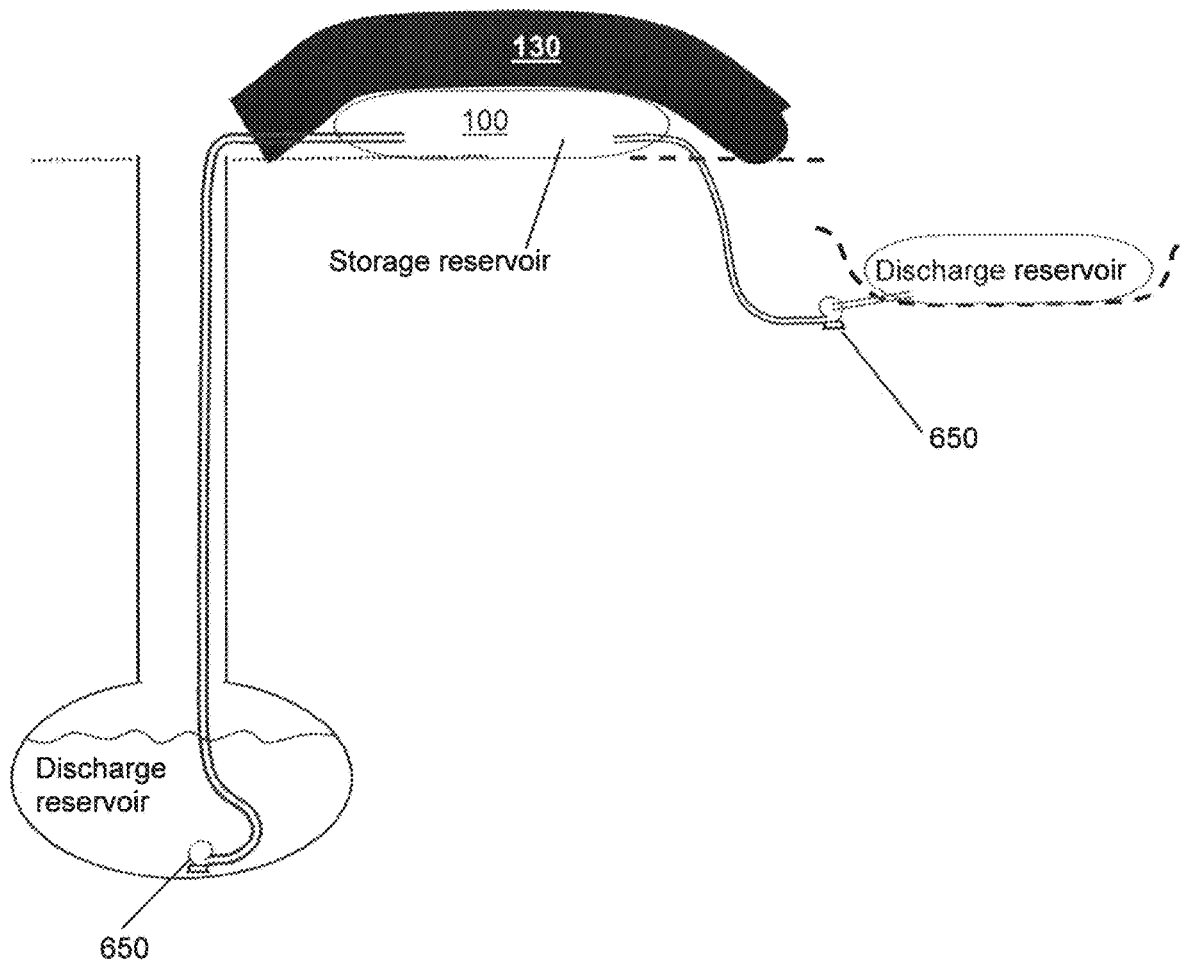
FIG. 5C shows a system in which a discharge reservoir is in an underground cavity.

In still other embodiments of the invention, there may be provided multiple discharge reservoirs at various elevations. This is also illustrated in FIG. 5C. The surface areas of respective reservoirs can determine how much the liquid levels of the respective reservoirs change during a discharge cycle. It is further possible that some of the liquid could be in an open reservoir while other of the liquid could be inside a bag.

It has been illustrated in FIG. 5A that a discharge reservoir could be in the form of a bag that is located in a depression in the ground, that is created by earthmoving or excavation in connection with providing the overburden on top of the storage bag. Such excavation or earthmoving could be accomplished, for example, by a bulldozer or similar piece of equipment. However, such equipment is not the only possible way to provide overburden and possible elevation difference. As illustrated in FIG. 5C, it would be possible to drill into the ground and possibly also excavate at the bottom of the hole. Drilling and/or excavating could provide loose earth material that can become part of the overburden 130. Furthermore, drilling possibly followed by excavating can provide an amount of depth and elevation difference that is greater than what is easily achievable by simple earthmoving at the surface of the earth. If a hole is drilled, it is further possible that a bag could be provided inside the drilled hole. It is not necessary that all of the storage volume be created by drilling. It may be desirable to create only a portion of the storage volume by drilling and to create another portion of the storage volume by earthmoving or by access to an open body of water, which may be at a different elevation from storage volume that is created by drilling. Any combination of these can be used, and they could be operated in any desired sequence. Each may provide a different elevation or amount of elevation change during the process of going from empty to full for that individual storage volume. If multiple storage volumes are used each having its own pressure range, it may be possible to provide an individual turbine or pump suited to the appropriate pressure range flowrate or other characteristics. Pump-turbine 650 is illustrated in FIGS. 5A-5C. If an underground cavern is created, it could have a bag inside it but it does not have to.

Tethers

Figure 6A:
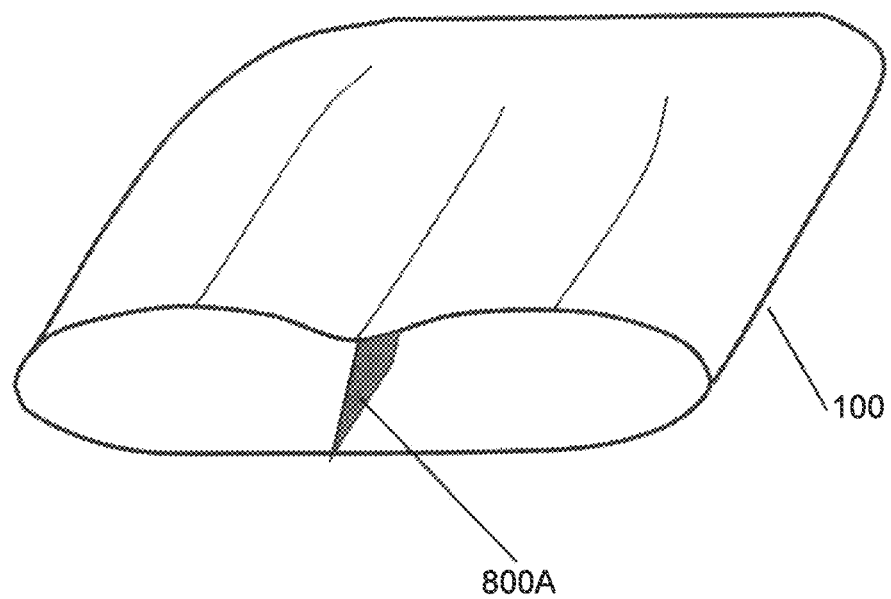
FIG. 6A shows a bag, in cross-section, having one internal tether.
Figure 6B:
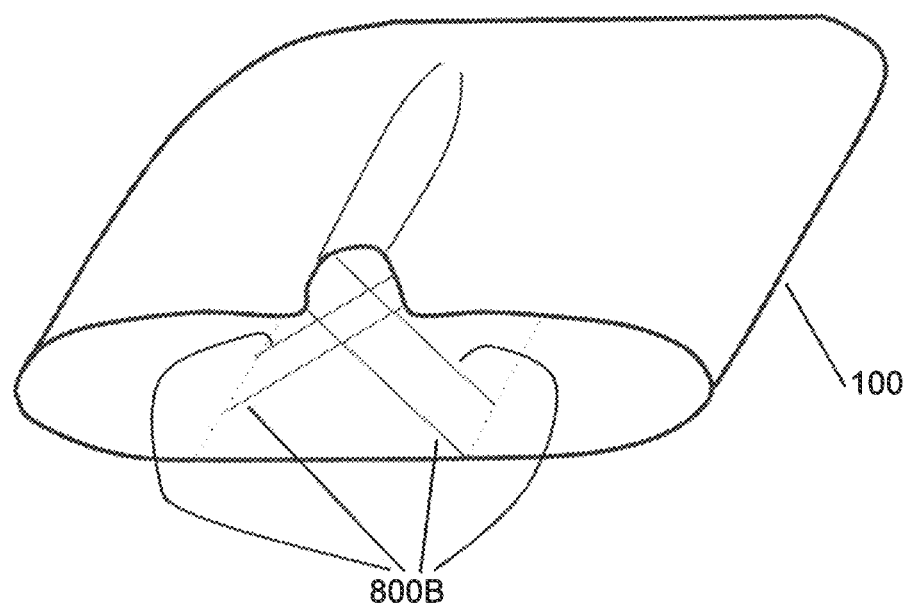
FIG. 6B shows a bag, in cross-section, having two internal tethers.

Referring now to FIGS. 6A-6B, in an embodiment of the invention, the bag may comprise internal tethers. A tether 800A or 800B may be a flexible member that connects the upper layer 110 of the bag 100 with the lower layer 120 of the bag 100 and is capable of carrying tensile load. The presence of a tether or tethers can influence or constrain the shape of the bag when the bag is filled or partially filled. For example, if a bag when filled tends toward a round or spherical shape, the presence of tethers in a middle region can constrain the bag to be flatter than it would be without such tethers. A tether 800A or 800B can be a cord-like component, or a plurality of cord-like components, or a web-like (sheet of fabric) component or a plurality of web-like components. Tethers 800 can be attached to the lower layer 120 and upper layer 110 of the bag 100 by stitches or by other means. FIG. 6A shows a tether 800A that extends in a generally vertical direction when the bag is full or nearly full. Such tethers can create a depression in the upper layer of the bag near their attachment points. This tether 800A is shown in FIG. 6A as a web-like (sheet of fabric) type of tether, which could be disposed in an interrupted manner. FIG. 6B shows tethers 800B that extend in diagonal directions in a criss-cross manner when the bag is full or nearly full. Such tethers 800B would be capable of creating a local protrusion in the bag between attachment points of the tethers. These tethers 800B are shown in FIG. 6B as being individual cord-like tethers.

In an embodiment of the invention, in a cross-section, the upper layer of the bag does not have to have the same dimension as the lower layer of the bag. For example, the upper layer of the bag can be longer or wider than the lower layer of the bag. This may result in "wrinkles" in the upper layer of the bag. Such "wrinkles" may have some impact on how the overburden interacts with the upper layer of the bag as the upper layer of the bag raises or lowers, and changes shape, during filling or emptying of the bag, and as the overburden displaces or changes shape during filling or emptying of the bag.

Further Comments

Where reference is made to water, it is equally possible to refer to generally any liquid. Such liquid may, for example, be seawater. Such liquid could be generally any aqueous liquid, or any liquid, subject of course to economic considerations. Even more generally, it would be possible to use any fluid, even a gas such as air.

The bag can be generally of any shape. One possibility of bag shape is a shape that is generally elongated, having a longitudinal axis. The length of the bag along the longitudinal axis can be longer than a dimension of the bag in any other direction. In cross-section perpendicular to the longitudinal axis, the bag, when it is filled or nearly filled, can have a cross-sectional shape that repeats itself along the longitudinal axis for some distance. Such a bag could be described as cylindrical or tubular (although it does not have to be round in cross-section). In such a bag, near the ends there could be a special geometry that is different from the geometry that repeats itself in the main part of the bag. In other embodiments, the bag need not be so elongated as has just been described. In these other embodiments, in plan view, the bag could be round, square, square with rounded corners, rectangular, rectangular with rounded corners, or still other shape.

What is referred to as a reservoir, either a storage reservoir or a discharge reservoir, could in general be a plurality of reservoirs. In a plurality of reservoirs, the individual reservoirs could be of identical design, size and elevation, or could be of different designs or different sizes or different elevations, in any combination. In such a situation, plumbing and equipment could be provided to access the individual reservoirs in any combination and in any sequence.

In embodiments of the invention, it is possible that the storage bag could be located, with respect to neighboring terrain, either generally above the neighboring terrain, at approximately the same level as the neighboring terrain, or generally below the neighboring terrain. Any of these could be achieved by appropriate earthmoving or structure. An underground cavern could be a mine that is not in use, or a naturally occurring cavern, or a cavern created for the purpose. Any desired structure could be placed or constructed on top of the bag or on top of the overburden that overlies the bag. The same is true for the discharge bag.

What is referred to as a solar collector could be a photovoltaic solar energy collector but could also be any other type of solar energy collector (thermal, mirror, etc.) that may be desired.

It is further possible that embodiments of the invention could be used for water storage in addition to or instead of for energy storage. Such purposes could include fire suppression, emergency response, municipal water supply, and other purposes.

Embodiments of the invention can also include variations and combinations of what has been disclosed, in any combination that is physically possible. Although embodiments of the invention have been disclosed, it is not desired to be limited thereby. The embodiments of the invention described above are intended to be merely exemplary; numerous variations and modifications will be apparent to those skilled in the art based on the disclosure. All such variations and modifications are intended to be within the scope of the present invention as defined in any appended claims.

All referenced documents are incorporated herein by reference in their entirety.

The following are some exemplary claims directed to the subject matter described above and should not be considered to limit the present invention; applicant reserves the right to pursue claims to any of the disclosed subject matter.

We claim:

1. An energy or fluid storage system comprising:
a substrate, said substrate having a substrate central region and, outward of and surrounding said substrate central region, having a substrate surrounding region, said substrate central region having a concave shape when viewed from above, and said substrate surrounding region having a convex shape when viewed from above,
a bag comprising a deformable boundary defining an interior that can be filled with said fluid and emptied of said fluid as desired, wherein said bag comprises a lower bag layer overlying said substrate in both said substrate central region and said substrate surrounding region and comprises an upper bag layer above said lower bag layer, said bag being capable of occupying a less-filled configuration and a more-filled configuration; and
a mass of overburden overlying said upper bag layer, said mass being able to be raised and lowered as a function of an extent of filling of said interior of said bag,
wherein said lower bag layer overlying said substrate has substantially identical configuration in both said less-filled configuration and said more-filled configuration,
wherein said upper bag layer, in said less-full configuration, in an upper bag layer central region, is concave when viewed from above and outward of said upper bag layer central region is convex when viewed from above, and wherein said upper bag layer, in said more-filled configuration, in said upper bag layer central region, is convex when viewed from above,
wherein said interior of said bag comprises an internal filler piece having a longitudinal direction that at least approximately extends along all or at least a portion of an outer perimeter of said bag,
wherein said internal filler piece has a cross-sectional shape, said cross-sectional shape being a shape of a cross-section taken perpendicular to said longitudinal direction of said internal filler piece,
wherein said cross-sectional shape has an outer radius of curvature at an outer-facing portion of said internal filler piece facing said outer perimeter of said bag, and has an inner radius of curvature at an inner-facing portion inward of said outer-facing portion,
wherein said inner radius of curvature is smaller than said outer radius of curvature, and
wherein said upper bag layer is unattached to said internal filler piece.

2. The system of claim 1, wherein said cross-sectional shape of said internal filler piece has a maximum overall horizontal dimension and a maximum overall vertical dimension, and said maximum overall horizontal dimension is greater than said maximum overall vertical dimension.

3. The system of claim 1, wherein said internal filler piece has a maximum overall vertical dimension that is at least two times a thickness of a material of which said bag is made.

4. The system of claim 1, wherein said outer radius of curvature of said internal filler piece is at least one thickness of a material of which said bag is made.

5. The system of claim 1, wherein said inner radius of curvature of said internal filler piece is less than one thickness of a material of which said bag is made.

6. The system of claim 1, wherein said inner radius of curvature of said internal filler piece is less than 0.2 of a thickness of a material of which said bag is made.

7. The system of claim 1, wherein said cross-sectional shape of said internal filler piece is entirely convex.

8. The system of claim 1, wherein said cross-sectional shape of said internal filler piece is convex in some places and concave in some other places.

9. The system of claim 1, wherein said cross-sectional shape of said internal filler piece tapers from a greater vertical dimension closer to said outer perimeter of said bag, to a smaller vertical dimension further inward.

10. The system of claim 1, wherein said internal filler piece is attached to an interior surface of said bag.

11. The system of claim 1, wherein said bag comprises at least one tether connecting said top layer and said bottom layer, said tether being capable of carrying tensile load.

12. The system of claim 1, wherein material of said bag that is in contact with said internal filler piece is a single thickness of said material of said bag.

\* \* \* \* \*